3,322,872
PLASTIC FLOOR COVERING
David K. Slosberg, Yardley, Pa., assignor to Bonafide Mills, Inc., New York, N.Y., a corporation of Maine
No Drawing. Filed Oct. 4, 1961, Ser. No. 142,759
1 Claim. (Cl. 264—115)

This invention relates to a novel plastic sheet particularly adapted for use as a covering for floors or the like and to the novel method of its production. More particularly, the invention is concerned with the concept of coating base stock for the production of plastic chips ultimately used in the formation of the plastic sheet.

It is an object of the present invention to provide a novel plastic sheet useful as a floor covering which can provide a variety of attractive and unusual appearances.

Another object of the present invention is to provide a novel relatively inexpensive method for producing a sheet capable of different appearances while utilizing the same novel method.

Still another object of the present invention is to provide a novel plastic sheet which is relatively simple to manufacture despite the various different outward appearances which may be provided.

According to the present invention, initially, a sheet, slab, tube or rod of vinyl material is produced. When a sheet is prepared in the first instance, the preparation thereof includes the steps of mixing ingredients such as, for example, polyvinyl chloride resins, pigments and other adjuvants, as desired, in the presence of heat. The materials are formed into continuous sheets by processing through rollers. Thereafter, a coating composition of a unique polymer type is applied directly to the pigmented and filled stock or transparent polyvinyl chloride sheet. This coating composition may be applied by any suitable means such as roller coating, knife coating, spray coating, immersion coating, gravure printing or various other related types of coating methods. The coating composition may be applied to either one side or the other or to both sides.

The synthetic resins exemplarily employed in the coating material are hereinafter specifically identified by their relative, specific, or intrinsic viscosities.

Auxiliary agents may be included in the coating composition. For example, a plasticizer may be used. Exemplary of appropriate plasticizers are: dialkyl phthalates in which the alkyl esterifying radical contains 4 to 10 carbon atoms; esters of dicarboxylic acids such as azelic acid, sebacic acid, adipic acid or the like; the hydrocarbon esters of phosphoric acid; and the epoxy polymers, such as epoxidized soybean oil. Specifically, exemplary of the plasticizers are butyl benzyl phthalate, butyl octyl phthalate, di-isodecyl phthalate, tri-cresyl phosphate and tri-octyl phosphate.

In order to prevent adverse reactions such as oxidation from taking place, the coating compositions may also contain stabilizers, as for example, the barium, zinc, lead, tin and cadmium salts of fatty acids containing 6 to 24 carbon atoms; dibutyl tin dilaurate; tin mercaptides and dibasic lead phosphite.

To facilitate the application of the coating, lubricants or other processing aids may be incorporated with the coating material. The processing aids which may be used include paraffin wax, stearic acid, stearates of lead, calcium, zinc and aluminum, coal tar resins, wood resin derivatives and others.

In the event colors are desired, the coating material may also be pigmented with either an organic or inorganic pigment of any desired color.

Filler ingredients may be added to the coating. These ingredients include, for example, calcium carbonate, calcium sulfate, magnesium silicate, aluminum silicate and others. It is to be understood, however, that such ingredients are not essential and when used, the amount of polyvinyl chloride and plasticizer utilized in the coating composition is lessened, varying in proportion to the amount of the filler used.

The coating composition may be produced either as plastisols, organosols, solutions or latices. Thus, in coating the plastic sheets virtually any method of application may be successfully utilized. It will be understood that for each of the different methods of applying the coating, it has been found desirable to vary the specific details and proportions of the ingredients of the composition to make it practical of application. Therefore, the following examples, which encompass specific compositions for each application technique, are not to be construed as in any way limiting the extent of this discovery. Instead, these compositions are only exemplary of certain formulae for producing coating which may be readily applied to the sheets.

The plastic sheet can be coated in various ways. Examples thereof are as follows:

The plastisol method, viz., preparing the coating as a plastisol dispersion and thereafter immersing, roller coating, spraying or otherwise subjecting the sheets to application of the coating;

The organosol method, viz., preparing the coating as a dispersion which is less viscous than the aforesaid plastisol dispersion and subjecting the plastic sheets to the application thereof; or The solution method, viz., preparing a solution of the coating composition and applying the same by spray coating or immersion techniques over the surface of the sheets;

The latex method, viz., same as above with the polymer in latex form, i.e., the polymer particles are suspended in a water system.

Of course, any other suitable manner of application may be used. In using the particular methods set forth the preferable compositions are as follows.

THE PLASTISOL METHOD

In utilizing this method, the coating composition, on a weight basis, may comprise from about 25% to 85% polyvinyl chloride resin of the plastisol type. If necessary, because of the viscosity of the plastisol, a viscosity depressant material may be utilized as, for example, polyvinylidene chloride. Also present are the following ingredients: from about 6% to 40% plasticizers, from about 1% to 3% stabilizer, from about .25% to 3% lubricant, pigment as desired and from none to about 55% filler ingredients (if desired).

A specific example of the coating composition for the plastisol method is:

| | Percent |
|---|---|
| Polyvinyl chloride resin-average specific viscosity about .60 (.4% solution in nitrobenzene at 20° C.) | 37.00 |
| Polyvinylidene chloride-average specific viscosity about .38–.42 (.4% solution in nitrobenzene at 20° C.) | 36.67 |
| Di-isodecyl phthalate | 21.33 |
| Epoxidized tall oil (oxirane oxygen 3.0–5.0 and iodine number 1.0–5.0 | 3.33 |
| Barium/cadmium salts of long chain fatty acids | 1.67 |
| Pigment, as desired. | |

THE ORGANOSOL METHOD

In the use of the organosol method the coating composition is first prepared and then thinned in an organic solvent such as naphtha, di-isobutyl ketone or any similar solvent.

The coating composition itself, on a weight basis, comprises from about 25% to 85% of polyvinyl chloride, from about 6% to 40% plasticizers, from about 1% to 3% stabilizer, from about .25% to 3% lubricant, pigment as desired and from about none to 55% filler ingredients (if desired). The resultant composition is thereafter thinned in a solvent, which on a weight basis comprises 12% to 35% of the total dispersion.

A specific example of the coating material is as follows:

| | Percent |
|---|---|
| Polyvinyl chloride resin-average specific viscosity about .60 (.4% solution in nitrobenzene at 20° C.) | 73.00 |
| Di-isodecyl phthalate | 21.33 |
| Epoxidized soy bean oil (oxirane oxygen 5.8–7 and iodine number .3 to 1.0) | 4.00 |
| Dibutyl tin dilaurate | 1.67 |
| Pigment, as desired. | |

Thereafter, the compound is thinned with naphtha, for example, in such quantities as to make the final dispersion comprises 85% composition and 15% naphtha.

THE SOLUTION METHOD

A solvent is employed in the coating compound used in this method to maintain the resin composition in solution. The solvents employed may be ketone such as methyl ethyl ketone and methyl isobutyl ketone, or xylene, toluene, nitro paraffins or tetrahydrofuran. The solvents are used to provide the flow characteristics to the coating composition whereby the surface area of the plastic sheets are substantially and adequately covered therewith.

The liquid coating composition, on a weight basis, may comprise from about 18% to 25% copolymer resin such as polyvinyl chloride-acetate copolymer, which has an intrinsic viscosity of .25% to .79% (in cyclohexanone at 20° C.), from none to 10% plasticizer, from 0.12 to 1.5% lubricant and from 35% to 80% solvents.

A specific example of this coating composition is as follows:

| | Percent |
|---|---|
| Polyvinyl chloride-acetate copolymer intrinsic viscosity .53 (in cyclohexanone at 20° C.) | 22.00 |
| Di(2 ethyl hexyl) phthalate (dioctyl phthalate) | 2.00 |
| Epoxidized tall oil (oxirane oxygen 3.0–5.0 and iodine number 1.0–5.0) | .50 |
| Barium/cadmium salts of long chain fatty acids | .25 |
| Methyl ethyl ketone | 50.00 |
| Toluene | 25.25 |

In addition to the generally accepted vinyl compounds that can be used by this method, the following polymers are also included:
(a) Polymers of acrylic esters
(b) Butadiene-acrylonitrile polymers
(c) Butadiene-acrylonitrile copolymerized with styrene.

THE LATEX METHOD

Latex is a milky white liquid which is a colloidal dispersion of resins in water. In vinyl latices, resin particles are spherical and usually negatively charged. Particle size may vary from 0.1 micron to 1 micron normally will be about .25 microns. Particles exhibit brownian movement. Commercially available latices are protected against mechanical and chemical shock by small additions of soap and/or emulsifiers.

Types of latices which can be used for coating sheets:
(a) Polyvinyl chloride (relative viscosity of resin in 1% cyclohexanone solution 1.50 to 3.00).
(b) Polyvinyl chloride (plasticized with di-octyl phthalate, etc.)
(c) Polyvinyl chloride-polyvinyl acetate copolymers (intrinsic viscosity .53 to .79 in cyclohexanone at 20° C.)
(d) Polyvinyl chloride copolymerized with ethyl acrylate, methyl acrylate and similar materials.
(e) Polyvinyl chloride copolymerized with polyvinylidene chloride (specific viscosity .38–.42) (0.4% solution in nitrobenzene).
(f) Polymers of acrylic esters.
(g) Butadiene-acrylonitrile polymers.
(h) Butadiene-acrylonitrile copolymerized with styrene.

A preferred polymer is pure polyvinyl chloride latex, which may be modified by the following:
(a) Plasticizers—such as dioctyl phthalate. These must be emulsified—i.e., put into a colloidal dispersion by means of appropriate equipment and recipe. A typical recipe:

| | Pts. |
|---|---|
| dioctyl phthalate | 75 |
| water | 22 |
| alkyl phenyl polyethylene glycol ether | 3 |
| | 100 |

(b) Compatible latices—such as butadiene-acrylonitrile latex.
(c) Stabilizers—such as dibutyl tin dilaurate, which have been emulsified.
(d) Lubricants—such as stearic acid, which are dissolved in plasticizer, then emulsified as shown.
(e) Fillers and pigments—such as titanium dioxide, precipitated calcium carbonate, calcium silicate. These ingredients can be added directly to latex and dispersed by a pebble mill or other means. They can also be predispersed in water and added as such.

| | Pts. |
|---|---|
| calcium silicate | 60 |
| water | 38 |
| alkyl aryl polyether alcohol | 2 |
| | 100 |

(f) Thickening agents—such as sodium polyacrylate, alginates, caseinates, cellulose derivitives may be added directly to the latex.
(g) Anti-foam agents—such as 2 ethyl hexanol, silicones, tributyl phosphate, etc.

Emulsified pigments and fillers are also, readily available for commercial use.

Recipe for the typical latex blend:

| | Pts. |
|---|---|
| Polyvinyl chloride latex (50% solids—relative viscosity of resin 2.50 1% cyclohexanone) | 68 |
| Dioctylphthalate emulsion (75% non-volatile) | 15 |
| Dibutyl tin dilaurate emulsion (75% non-volatile) | 1.5 |
| Sodium polyacrylate solution (10% non-volatile) | 10.0 |
| | 94.5 |

Pigment, as required.
Volatile ingredient is water.

The aforementioned coating compositions are applied to sheets which may have a thickness of from .005–0.500 inch. The surface of the sheet may be smooth, i.e. polished or it may be ridged or textured. The sheets may be made by calendering or milling.

As aforesaid, the initially prepared product which is thereafter coated and then granulated into chips may be in the form of a tube or rod prepared by extrusion and the like and the coating applied to the tube or rod.

The thickness of the coatings is between .0001 to .020 inch.

The coating may be accomplished while the base stock is hot to facilitate continuous operation. This method is preferred when a latex system is used, since the drying of the water is accelerated. It is also the preferred approach in coating with plastisols or organosols. With solution coating, safety requirements necessitate that the coating be accomplished after it has cooled.

After the coated sheet is prepared according to the present invention, the sheet undergoes the unique process of granulating to provide irregularly shaped solid bodies or chips. It is to be noted that all sides of the solid bodies or chips do not bear the coating which has been applied to the surface of the sheet. As a result of this discovery, the plastic sheet ultimately produced presents a unique and unusual, novel and attractive appearance of various types. In accomplishing this final result, the plastic chips provided as hereinbefore described are molded or cured. The molding or curing takes place under heat and pressure conditions sufficient to fuse the chips bearing the coated material together to produce an integral plastic sheet of the desired thickness. The sheet may initially be produced in thick slabs which may be cut to the desired thickness of the ultimate product, or it may be produced in thin sheet form and become the final plastic sheet either with or without a sanding or buffing operation on the surface thereof.

The molding conditions may vary in heat from 250° to 350° F. and from a pressure of about 50 pounds per square inch in, for example, a continuous curing operation to 3,000 pounds per square inch in, for example, an hydraulic press operation. The pressure also depends upon the type of compound and the temperature conditions used in the molding operation.

To produce a sheet of ½ inch thickness, for example, as a final product, when the original sheet is coated by the solution method set forth above and the chips thereafter produced, the said chips may be molded under pressure of 200 pounds per square inch for about 10 minutes at a temperature of approximately 330° F. The type of chips employed, the coating composition, the work area conditions and the desired thickness of the resultant sheet determine the molding factors. When the coated chips are fused, there is provided an integral plastic sheet.

It is to be understood that a variety of different appearances may be obtained utilizing the method set forth in regard to the production of the plastic sheet. For example, when the base stock is transparent and coated with a pigmented polymer the sheet ultimately prepared after granulating the stock, as aforesaid, presents an extremely unusual and attractive appearance. When the base stock itself is colored and coated with a pigmented polymer, still another type of attractive outward appearance is presented in the final product. Therefore, using the same steps set forth different attractive types of plastic sheets may be produced.

While the invention and the compositions and methods of application have been described in great detail, it will be understood that the scope of the invention is not to be considered in any way limited thereby. Variations and modifications may therefore be made without departing from the spirit of the invention or the scope of the appended claim.

What is claimed is:

The method of producing a plastic sheet having a surface for display which comprises the steps of coating both surfaces of a solid polyvinyl chloride member with a liquid coating comprising a polymer selected from the group consisting of polyvinyl chloride, polyvinyl chloride-acetate copolymer, polymers of acrylic esters, butadiene-acrylonitrile copolymerized with styrene, granulating the coated polyvinyl chloride member to provide chips having coated and uncoated sides, applying pressure to a mass of said chips to reduce them to sheet form, and heating said sheet while maintaining it under pressure until said chips under the influence of said heat and said pressure have been deformed and said chips have randomly bonded together to form an integrated, substantially self-supporting sheet.

References Cited
UNITED STATES PATENTS

| | | | |
|---|---|---|---|
| 2,054,848 | 9/1936 | Bowker | 264—77 X |
| 2,547,989 | 4/1951 | Wiley | 264—77 |
| 2,683,094 | 7/1954 | Jones et al. | 154—49 |
| 2,722,265 | 11/1955 | Kelly et al. | 154—49 |
| 2,888,975 | 6/1959 | Benedict | 156—303 X |
| 2,987,102 | 6/1961 | Heinrichs | 161—5 |
| 3,000,754 | 9/1961 | Zentmyer | 154—49 |
| 3,015,640 | 1/1962 | Weaver et al. | 154—49 |
| 3,017,714 | 1/1962 | Slosberg et al. | 161—162 |
| 3,078,179 | 2/1963 | Kuhn et al. | 154—49 |
| 3,148,076 | 9/1964 | Snyder | 117—21 |
| 3,161,556 | 12/1964 | Slosberg | 156—278 |
| 3,255,285 | 6/1966 | Chilson | 264—109 |

EARL M. BERGERT, *Primary Examiner.*

H. ANSHER, R. J. CARLSON, *Assistant Examiners.*